S. M. LILLIE.

Fire-Extinguisher.

No. 9,023. Reissued Jan. 6, 1880.

WITNESSES:

David Lithgow

J. Bodine Jr.

S. Morris Lillie INVENTOR

N. PETERS, PHOTO-LITHOGRAPHER, WASHINGTON, D. C.

UNITED STATES PATENT OFFICE.

S. MORRIS LILLIE, OF PHILADELPHIA, PENNSYLVANIA.

FIRE-EXTINGUISHER.

SPECIFICATION forming part of Reissued Letters Patent No. 9,023, dated January 6, 1880.

Original No. 117,900, dated August 8, 1871. Application for Reissue filed December 24, 1878.

*To all whom it may concern:*

Be it known that I, S. MORRIS LILLIE, of Philadelphia, in the State of Pennsylvania, have invented new and useful Improvements in Fire-Extinguishers; and I hereby declare that the following specification is a full, clear, and exact description of the same, reference being had to the accompanying drawings, forming a part of this specification.

The object of my invention is to provide for buildings, ships, &c., a fire-extinguisher that shall be automatic in its working—that is, one that will be set in operation automatically by any fire that may occur in the rooms to be protected by it.

It consists in a set of distributing-pipes connecting the rooms to be protected with a supply of some mephitic gas, as ammonia, carbonic acid, sulphurous acid, and the like, and in releasing devices composed, in part, of some fusible material, combustible or explosive, attached to such pipes, and operated automatically, on the occurrence of a fire, to release the extinguishing agent through the agency of fuses or electricity, as hereinafter described.

The releasing devices are located either at the discharging-points of the pipes in the rooms to be protected or at some sections of the pipes outside of the rooms, preferably near the source of supply of the fire-extinguishing agent.

The fuses are to be trained around the rooms to be protected and connected with the releasing devices, so that a fire occurring in any of the rooms would soon ignite a fuse, which would, in turn, operate a releasing device and cause the discharge of the fire-extinguishing agent for the repression of the fire.

In the use of electricity circuit-closers are placed in the rooms to be protected, constructed to be operated by an increase of temperature to close electrical circuits connected with releasing devices, which devices will be operated to release the fire-extinguishing agent by the passage of a current of electricity.

In the drawings, Figures 3 and 4 (Fig. 4 being a section of Fig. 3 along the line C′ D′) show a releasing device into whose construction a fusible material enters that may be used in connection either with fuses or electricity; and Fig. 6 also shows a releasing device that may be operated automatically through the agency of either.

In Figs. 3 and 4, B′ N′ T′ is a short section of pipe that is in communication with a supply of some fire-extinguishing agent, and with the room or rooms to be protected.

F is a plug of some fusible material, sealing the pipe. A is a small holder surrounding the sealed portion of the pipe, filled with some inflammable material, and suitably perforated to allow of access to support combustion within it.

The fuses which are trained around the room or rooms to be protected connect with the inflammables in the holders A of one or more of these devices attached to pipes opening into the rooms to be protected, and communicating with a supply of a fire-extinguishing agent. In the event of a fire breaking out in a room thus provided one of the fuses would soon become ignited, and it, in turn, would ignite the inflammables in the holder A of the device with which it was connected, which would cause the fusion of the fusible plug, and thus allow the extinguishing agent to flow through the pipe to which the device was attached into the room for the suppression of the fire.

The method of using electricity to automatically operate this device is as follows: A connection is made between the ends of a fine platinum wire, $S^2$ O, Fig. 4, passing through the inflammables in the holder A, and wires connected, respectively, with the poles of a galvanic battery or other source of electricity. One of these wires elsewhere in its circuit connects with a circuit-closer so operating that for all temperatures below, say, 250° Fahrenheit the circuit will be open, but at which temperature, and for all above it, it will be closed. These circuit-closers are to be placed in different parts of the room or rooms to be protected, in connection with releasing devices of the construction described above attached to pipes leading from a supply of a fire-extinguishing agent to the rooms to be protected. In the case of a fire occurring in either of the rooms thus provided a circuit would soon be closed by the circuit-closer nearest the fire, and the platinum wire $S^2$ O of any releasing device included in that circuit would be made incandescent by the passage of a current of electricity; the inflammables in the holder A would be ignited thereby, which would fuse the fusible-metal plug and open the pipe for the flow of the extinguishing agent into the room for the suppression of the fire.

Fig. 5 represents one kind of circuit-closer. It consists of a thermometer-tube, $B^2 A^2$, open at the top, and fastened to a back, $D^2 C^2$. Into opposite sides of the tube are fused wires *p d*, extending into the interior.

The apparatus is fastened in a perpendicular position, and enough mercury is poured into the tube so that, when at the desired temperature, it will reach the wires and close the circuit.

This releasing device, consisting of the holder A and plug F, can be placed at any point of a conducting-pipe between its outlet and the supply of the extinguishing agent, and, wherever it may be, connections can be made between it and the room or rooms with which the pipe it seals communicates by means of fuses or electricity, so that a fire occurring in either of the said rooms will cause it to allow the extinguishing agent to flow through the pipes into them.

The releasing device illustrated by Figs. 3 and 4 I give as a type of all releasing devices into whose construction a fusible material enters, and which are operated by a fire automatically through auxiliary means, such as the fuses and electricity.

Fig. 6 represents another apparatus that can be used in connection with fuses or electricity for the automatic discharge of a fire-extinguishing agent. It consists of a hollow cylindrical plug, E J, Fig. 6, which is filled with some explosive, through which passes the platinum wire or fuse *b e*, according as it is used in connection with electricity or fuses. The plug E J is threaded, and is screwed into the end of a pipe discharging into the room in which the fuses are trained or the circuit-closers placed. The fuses or wires in a room connect with one or more of these devices, and in case of a fire occurring in it the explosives of one or more of these devices are soon ignited and exploded by the fuses, or by the incandescence of the platinum wires due to the flow of electricity, thus bursting the ends of the pipes and allowing the discharge of the fire-extinguishing agent into the room for the suppression of the fire.

I do not wish to limit myself to the particular method shown for using explosives for the automatic discharge of fire-extinguishing agents, nor to any particular explosive.

Figs. 1 and 2 show a reservoir that may be used for the storage of a fire-extinguishing agent, and is designed more particularly to be used for mephitic gases. This reservoir is supposed to be divided into as many compartments as there are rooms or series of rooms to be protected, each compartment to be in communication with its own room or series of rooms by a pipe or pipes, and to have a capacity to hold sufficient of the fire-extinguishing agent to suppress any fire that might occur in its own room or series of rooms.

Figures 1, 2, 5:
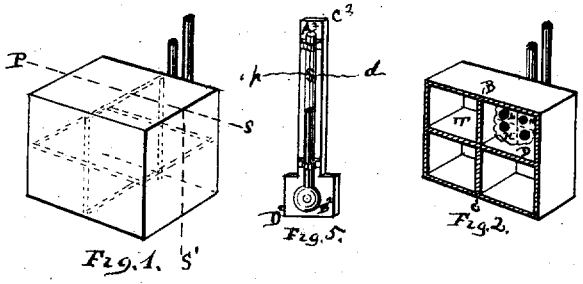
Figs. 1 and 2 show a cubical reservoir designed to be used with four rooms, and which is consequently divided into four compartments, as shown in Fig. 2, which is a section of Fig. 1 along the plane of the lines P S and S S′.
Figures 3, 4, 6:
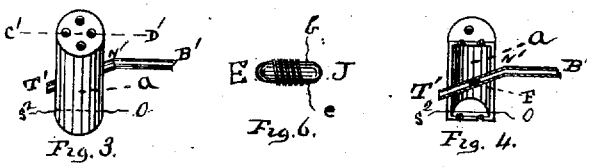
Figure 7:
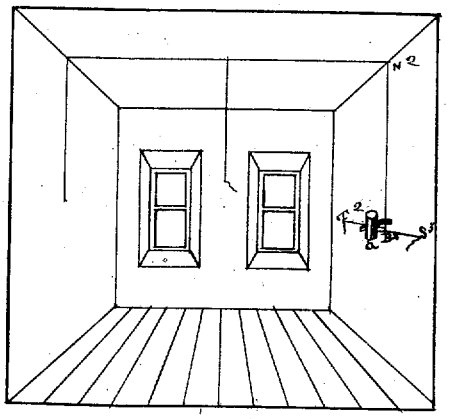
Fig. 7 shows an arrangement of fuses in a room in connection with one of the releasing devices shown in Figs. 3 and 4.

A is the holder and pipe, from which the fuses $B^3 S^3$, $B^3 T^2$, and $B^3 N^2$ radiate to different parts of the room. As many of these devices may be placed in a room as its size and the inflammability of its contents may seem to require.

Having thus described my invention, I claim as new and desire to secure by Letters Patent—

1. The combination, with pipes for distributing a fire-extinguishing agent, of discharging or releasing devices, automatic circuit-closers operated by a rise in temperature, and wires connecting the discharging devices with the circuit-closers, and through them with some source of electricity, the whole so arranged that a rise of temperature to or above a fixed degree will close the circuit, cause the passage of a current or currents of electricity, and the consequent release of the extinguishing agent, substantially as and for the purpose set forth.

2. The combination, with pipes for conducting a fire-extinguishing agent through a building, of releasing devices composed in part of an easily-fusible material, the fusion of which will effect the discharge of the fire-extinguishing agent, and of auxiliary means for automatically causing the fusion of the same through the agency of a fire, substantially as and for the purpose set forth.

3. The combination, with a structure, of a stationary reservoir divided into as many compartments as there are rooms or suites of rooms in the structure to be protected, each compartment being connected with a separate room or suite of rooms, and containing sufficient of the extinguishing agent for the protection of the same, substantially as and for the purpose herein set forth.

S. MORRIS LILLIE.

Witnesses:
WM. R. GREBLE,
W. W. DOUGHERTY.